Nov. 23, 1926.  
L. S. HARBER  
1,607,826  
EXHAUST HOOD FOR OVENS  
Filed Nov. 28, 1923   2 Sheets-Sheet 1
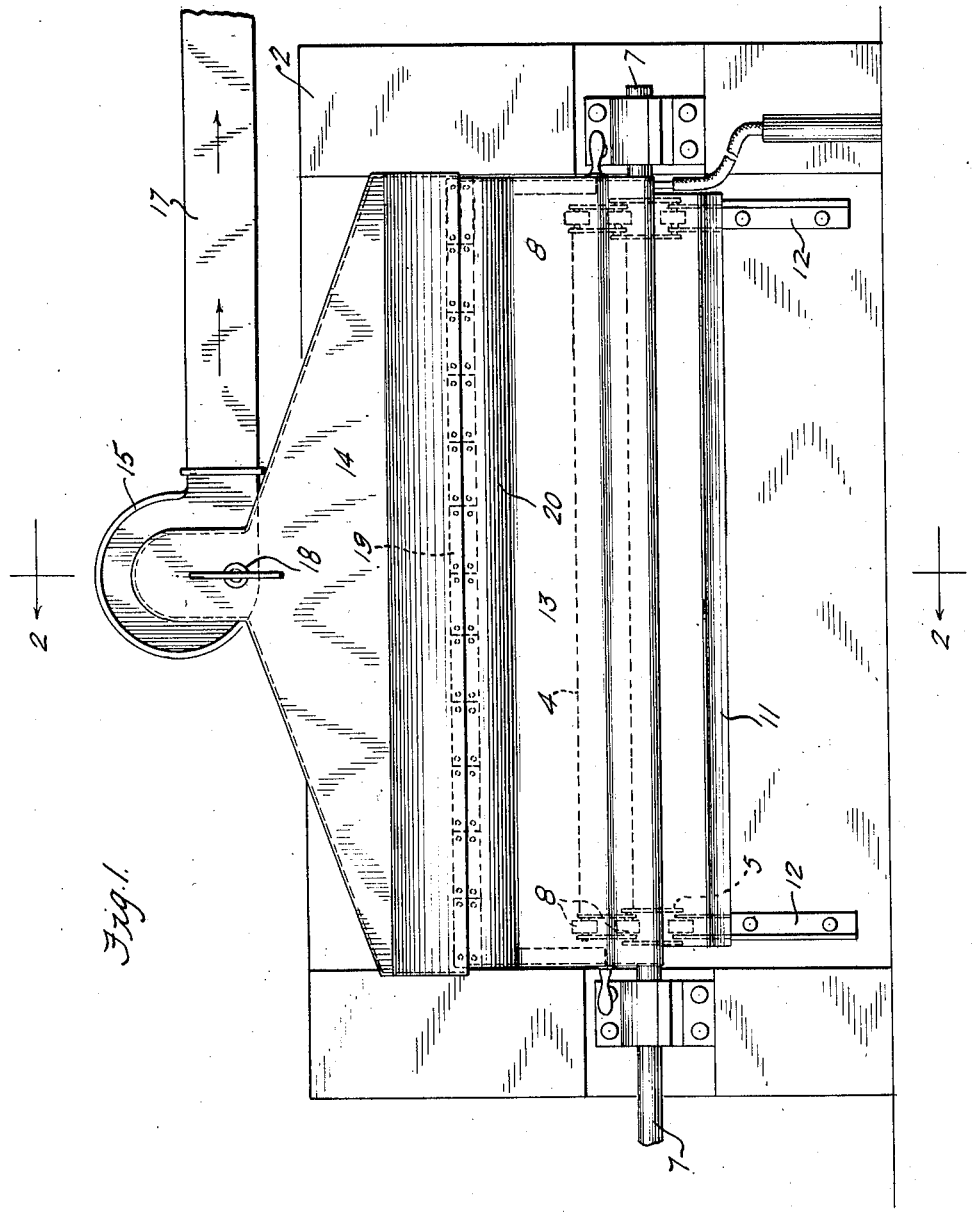
INVENTOR  
LAURENCE S HARBER  
BY  
ATTORNEYS Nov. 23, 1926.　　　　　　　　　　　　　　　　1,607,826
L. S. HARBER
EXHAUST HOOD FOR OVENS
Filed Nov. 28, 1923　　　　2 Sheets-Sheet 2
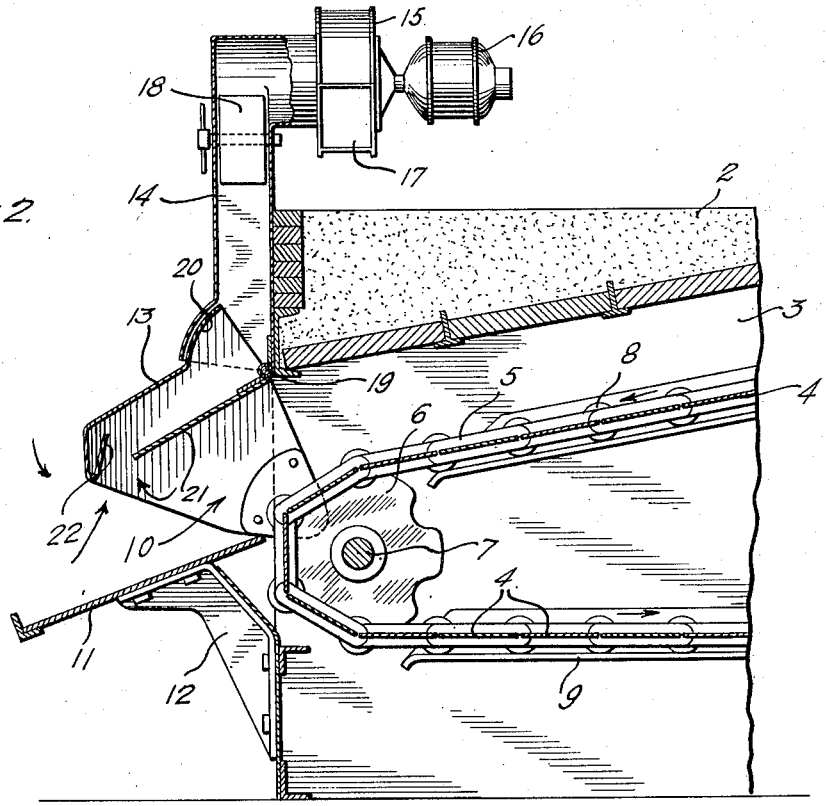
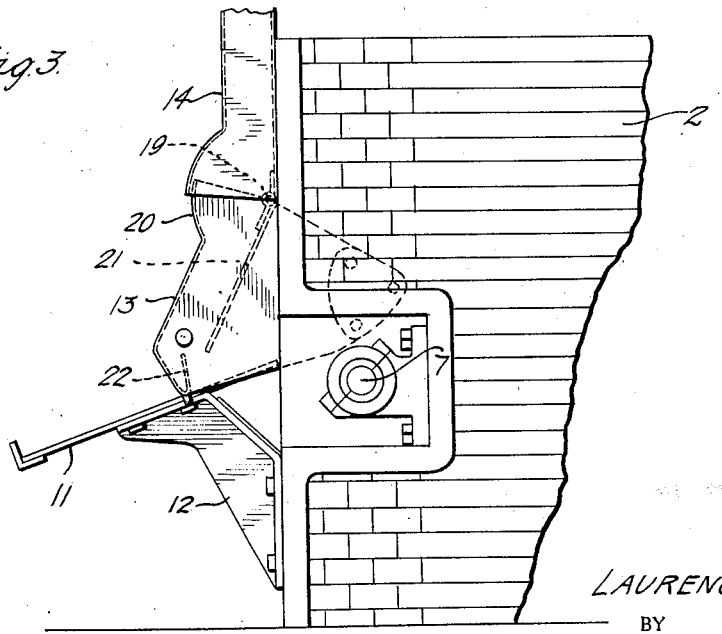
INVENTOR
LAURENCE S. HARBER.
BY
ATTORNEY Patented Nov. 23, 1926.

1,607,826

UNITED STATES PATENT OFFICE.

LAURENCE S. HARBER, OF WHITE PLAINS, NEW YORK, ASSIGNOR TO BAKER-PERKINS COMPANY, INC., OF WHITE PLAINS, NEW YORK.

EXHAUST HOOD FOR OVENS.

Application filed November 28, 1923. Serial No. 677,462.

This invention relates to baker's ovens for baking bread and other material on a commercial scale.

The invention as illustrated in this application is embodied in an oven of the so-called traveling type in which the material is carried through the oven upon a series of baking plates mounted on an endless conveyor. In the operation of ovens of this type, the material to be baked is fed into the oven through an opening at the feed end thereof by a workman standing adjacent this opening and the baked material is discharged from the oven by the conveyor through an opening at the opposite or discharge end of the oven. The material is ordinarily deposited upon a receiving plate or platform by the conveyor and is removed therefrom by a workman standing adjacent the discharge opening. During the operation of the oven the heated air and gases are discharged in large quantities at the openings at the ends of the oven and belch forth into the faces of the workmen, thereby causing a great deal of discomfort. Furthermore, the breathing of the gases and products of combustion issuing from the oven is liable to result in serious injury to the health of the workmen. On account of the uncomfortable and unhealthful conditions of this work, it is difficult to secure workmen who will continue at this labor for more than a short period of time.

Although the invention is illustrated as embodied in a baker's oven of the traveling type, it is to be understood that in its broader aspects the invention is not limited to this particular type of oven but that certain features thereof may be embodied in ovens of the non-traveling type.

The primary objects of the invention are to improve the construction and mode of operation of baker's ovens to obviate the disadvantages above pointed out and to produce an oven in which the workman may stand adjacent the feed or discharge openings of the oven without discomfort and without risk of injury to his health.

With this object in view the invention contemplates the provision of devices located at an opening in the oven for carrying off the heated air and gases issuing from the oven before they reach the workman standing adjacent this opening, these devices embodying certain novel and improved features hereinafter described and pointed out in the claims.

In the drawings,

Figure 1 is a view in end elevation illustrating a baker's oven embodying the invention;

Fig. 2 is a sectional view of one end of the oven taken substantially on the line 2—2 of Fig. 1, illustrating certain of the parts in one position, and Fig. 3 is a view in side elevation of the end of the oven illustrating certain of the parts in different positions.

In the form of the invention illustrated in the drawings of this application, the oven comprises an elongated casing indicated at 2 consisting of a framework upon which are built up walls of brick or other suitable insulating materials. Within this casing is an elongated baking chamber indicated at 3, through which travel a series of baking plates indicated at 4 mounted on an endless conveyor indicated at 5. The material to be baked is placed upon the baking plates 4 at the receiving end of the oven and is carried through the oven upon said plates. The conveyor 5 passes at its outer ends about suitable sprocket wheels, one of which indicated at 6 in the drawing, is mounted upon a shaft 7 journaled in bearings carried by the side walls of the oven. The conveyor is provided with a series of rolls 8 and between its ends travels upon tracks 9 engaged by these rolls, as clearly shown in the drawing.

The drawings of this application illustrate the discharge end of an oven. The oven is provided with a discharge opening 10, through which the articles carried by the baking plates 4 are projected by the movement of the conveyor which travels in the direction of the arrows, Fig. 2. The articles carried by the respective baking plates are deposited in succession upon a receiving plate 11 located adjacent the discharge end of the conveyor and below the discharge opening 10, this plate being mounted upon a bracket 12 secured to the casing 2.

In the operation of an oven of the type illustrated in the drawing, the workman stands adjacent the outer edge of the receiving plate 11 and removes the baked articles from the receiving plate as they are deposited successively thereon by the baking plates. The door of the opening 10 is, of course, open at this time and the heated air and gases from within the oven are discharged therefrom through this opening into the face of the workman standing at this point, thereby causing great discomfort and making the work especially unhealthful. To obviate these disadvantages, in the present construction means is provided to form a conduit the inlet end of which is located adjacent the opening 10 for carrying off the heated air and gases discharged at this point before they reach the workman. This means in the form of the invention shown comprises a hood 13 mounted adjacent the discharge opening 10 of the oven and extending outwardly therefrom over the receiving plate 11, the hood forming the inlet end of the conduit. This hood is preferably made of sheet metal and comprises opposite side walls and an end wall, the hood being substantially U-shaped in cross-section. The upper portion of the hood is connected with a discharge pipe 14 and the heated air and gases are preferably drawn from the hood upwardly through this discharge pipe by means of an exhaust fan 15 operated by a motor 16 and connected with this pipe. The gaseous mixture is discharged from the fan through an outlet pipe 17. 18 indicates a suitable damper adapted to be manually adjusted to control the suction through the pipe 14.

In the construction shown, the hood 13 is mounted so that it may be adjusted with relation to the discharge opening of the oven to produce the most effective results. To this end the hood is pivoted at 19 to the casing 2 of the oven and is provided with a telescopic connection 20 with the discharge pipe 14. This manner of mounting the hood not only enables the hood to be adjusted to the most effective position to prevent the passage of the gaseous mixture from within the oven outwardly beyond the hood, but also allows the hood to be depressed to the position shown in Fig. 3 to close the discharge end of the oven.

To increase the effectiveness of the hood in carrying off heated air and gases passing outwardly through the opening 10, and for preventing these from reaching the operator, the hood is provided with deflector plates 21 and 22 forming a constricted passage in the hood at a point at some distance from the discharge opening through which passage the gaseous mixture is drawn with a comparatively high velocity. The plate 21 which forms a partition between the side walls of the hood normally occupies the inclined position shown in Fig. 2 so that the gaseous mixture escaping through the discharge opening passes along this deflector plate to the outer edge thereof. The deflector plate 22 which extends inwardly from the outer wall of the hood is located sufficiently close to the outer edge of the deflector plate 21 to form a comparatively narrow passage between the two plates. Fig. 2 shows the direction of the currents passing through this opening. It will be noted from this figure that not only are currents of high velocity created to draw the gaseous mixture issuing from the oven through this opening, but also that a certain quantity of air from outside the oven beyond the hood is drawn inwardly into the hood. This very effectively insures that none of the heated air and gases shall reach the operator and also tends to create a constant circulation of outside air at the point where the operator stands.

It will be noted that when the hood is swung downwardly in the position shown in Fig. 3, the oven is closed except for the comparatively small opening between the deflector plates 21 and 22. The damper 18 may be adjusted when the hood is closed to prevent the loss of heat through the hood and the pipe 14.

It is to be understood that except as defined in the claims, the invention is not limited to any particular construction or type of baker's oven. It is also to be understood that the invention is not limited to the particular construction and arrangement of parts of the illustrated embodiment of the invention, but that the invention may be embodied in other forms within the scope of the claims.

Having explained the nature and object of the invention and having specifically described a construction embodying the invention in its preferred form, what is claimed is—

1. A baking oven having in combination a baking chamber having an opening at one end thereof through which the material is passed, a hood mounted adjacent to and over-hanging the opening, a conduit within the hood having a constricted opening adjacent the outer edge of the hood, and air exhaust means connected with said conduit.

2. A baking oven having in combination a baking chamber having an opening at one end thereof through which the material is passed, a fixed conduit, air exhaust means connected to said conduit, means for cutting off or controlling passage of air through said conduit, a hood mounted adjacent to and overhanging the opening, means for pivotally supporting the hood for vertical adjustment thereof, and a telescopic connection between said hood and said conduit, permitting the passageway from said hood to said conduit to remain open when said hood is in closed position.

Signed at New York city, New York, this 21st day of November, 1923.

LAURENCE S. HARBER.